(12) United States Patent
Shambaugh et al.

(10) Patent No.: US 6,970,821 B1
(45) Date of Patent: Nov. 29, 2005

(54) METHOD OF CREATING SCRIPTS BY TRANSLATING AGENT/CUSTOMER CONVERSATIONS

(75) Inventors: Craig R. Shambaugh, Wheaton, IL (US); Anthony Dezonno, Bloomingdale, IL (US); Mark J. Power, Carol Stream, IL (US); Jared Bluestein, Wilmot, NH (US); Kenneth Venner, Winfield, IL (US); Jim F. Martin, Woodside, CA (US); Darryl Hymel, Batavia, IL (US); Laird C. Williams, St. Charles, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 816 days.

(21) Appl. No.: 09/670,093

(22) Filed: Sep. 26, 2000

(51) Int. Cl.[7] .......................... G10L 21/00; G10L 15/26; G10L 15/18; H04M 1/64
(52) U.S. Cl. ...................... 704/270; 704/257; 704/235; 379/88.01; 379/88.11
(58) Field of Search .............................. 704/231, 258, 704/270, 9, 257; 379/88.01, 88.18

(56) References Cited

U.S. PATENT DOCUMENTS

| | | | | |
|---|---|---|---|---|
| 5,761,631 A | * | 6/1998 | Nasukawa | 704/9 |
| 6,100,891 A | * | 8/2000 | Thorne | 345/854 |
| 6,102,970 A | * | 8/2000 | Kneipp | 717/155 |
| 6,313,833 B1 | * | 11/2001 | Knight | 345/764 |
| 6,567,787 B1 | * | 5/2003 | Walker et al. | 705/16 |
| 6,651,045 B1 | * | 11/2003 | Macaulay | 706/11 |
| 6,721,416 B1 | * | 4/2004 | Farrell | 379/265.07 |
| 2002/0019737 A1 | * | 2/2002 | Stuart et al. | 704/275 |

FOREIGN PATENT DOCUMENTS

EP 0 716 532 6/1994

OTHER PUBLICATIONS

Anisimov et al., "Formal model, language and tools for design agent's scenarios in call center systems", Proceedings of the 32nd Annual Hawaii International Conference on System Sciences, Jan. 5-8, 1999, pp. 1-9.☐☐*

*Tracking Conversational Context for Machine Mediation of Human Discourse*; Tony Jebara, Yuri Ivanov, Ali Rahimi and Alex Pentland, American Association for Artificial Intelligence; 3 page document.

*Spoken language systems—beyond prompt and response*; P J Wyard, A D Simons, S Appleby, E Kaneen, S H Williams and K. R. Preston; BT Technol J. vol. 14 No. 1 Jan. 1996, pp. 187-205.

* cited by examiner

*Primary Examiner*—Susan McFadden
*Assistant Examiner*—Brian Albertalli
(74) *Attorney, Agent, or Firm*—Welsh & Katz, Ltd.

(57) ABSTRACT

A method and apparatus are provided for presenting script to be followed by a telemarketer during a threaded conversation with a customer. The method includes the steps of recognizing a word content of a response of the customer to a first portion of the presented script and detecting key words and key words in context of the response. The method further includes the steps of evaluating the detected key words and key words in context to determine an information content, comparing the information content of the evaluated words with an information content of a plurality of expected customer responses and selecting the expected customer response with a closest relative match and following a script associated with the selected expected customer response of the customer as a second portion of the presented script.

26 Claims, 2 Drawing Sheets

METHOD OF CREATING SCRIPTS BY TRANSLATING AGENT/CUSTOMER CONVERSATIONS

FIELD OF THE INVENTION

The field of the invention relates to telemarketing and more particularly to presentation materials used by telemarketers.

BACKGROUND OF THE INVENTION

Telemarketing is one of the fastest growing areas of commerce. Hardly a day goes by for anyone without receipt of a call from a telemarketer.

While some calls are informative and well-focussed, other calls are viewed as tedious and unwelcome. Often the perception of the telemarketer by the customer is based upon the skill and training of the telemarketer.

In order to maximize the performance of telemarketers, telemarketing organizations usually require telemarketers to follow a predetermined format during presentations. A prepared script is usually given to each telemarketer and the telemarketer is encouraged to closely follow the script during each call.

Such scripts are usually based upon expected customer responses and typically follow a predictable story line, including a beginning, a middle and an end. Typically, such scripts begin with the telemarketer identifying herself/himself and explaining the reason for the call. The script will then usually begin with an explanation of the product and the reasons why a consumer should wish to have the product. Finally, the script may complete the presentation with an inquiry of whether the customer would want to purchase the product.

While such prepared scripts are sometimes effective, they are often ineffective where a customer asks unexpected questions or where the customer is in a hurry and wishes to complete the conversation as soon as possible. In these cases, a telemarketer will often become flustered or loose track of where he/she is in the story line. Often a call which could have resulted in a sale will result in no sale and, more importantly, an irritated customer. Because of the importance of telemarketing, a need exists for a better method of preparing telemarketers.

SUMMARY

A method and apparatus are provided for presenting script to be followed by a telemarketer during a threaded conversation with a customer. The method includes the steps of recognizing a word content of a response of the customer to a first portion of the presented script and detecting key words and key words in context of the response. The method further includes the steps of evaluating the detected key words and key words in context to determine an information content, comparing the information content of the evaluated words with an information content of a plurality of expected customer responses and selecting the expected customer response with a closest relative match and following a script associated with the selected expected customer response of the customer as a second portion of the presented script.

DETAILED DESCRIPTION OF A PREFERRED EMBODIMENT

Figure 1:
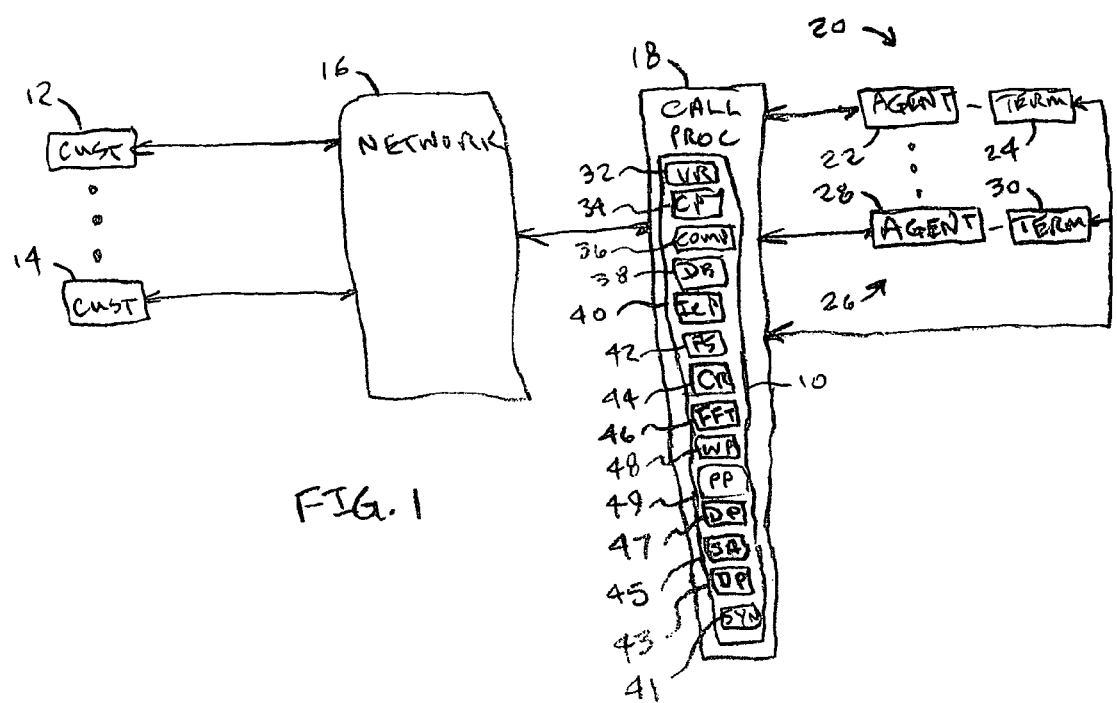
FIG. 1 is a block diagram of a scripting system under an illustrated embodiment of the invention, shown in a context of use.

FIG. 1 is a block diagram of a scripting system 10 in accordance with an illustrated embodiment of the invention and shown generally in a context of use. As shown, calls may be connected between customers 12, 14 and a telemarketer (e.g., agent) 20, 26 through a communication system network 16 and call processing system 18. The communication system network 16 may be any appropriate communication system network (e.g., a public switched telephone network, cellular telephone, satellite, land mobile radio, Internet, etc.). Similarly, the call processor 18 may be an automatic call distributor (ACD), a host computer, etc.).

The scripting system 10 may be implemented under any of a number of different formats. For example, where implemented in connection with the PSTN, satellite, cellular or land mobile radio, the script processor 10 would operate within a host computer associated with an ACD and receive voice information (e.g., pulse code modulation (PCM) data) from a switched circuit connection (provided by a matrix switch of the ACD) which carries voice between an agent 20, 26 and a customer 12, 14.

Where the scripting system 10 is implemented in connection with the Internet, the scripting system 10 may operate from within a server. Voice information may be carried between an agent 20, 26 and customer 12, 14 using VoIP telephony. The scripting system 10 may monitor the voice of the agent and customer by monitoring voice packets passing between the agent 20, 26 and customer 12, 14.

For purposes of explanation, it may be assumed that the call processor 18 is a host computer which monitors a call connection between the agent 12, 14 and customer 12, 14 and provides scripted text for display on a computer terminal 24, 30 of an agent 20, 26. The host 18 may intercept packets of voice data from the agent 20, 26 and route the voice data to voice recognition software 32. Similarly, the host 18 may intercept voice data from the customer 12, 14 and route the voice data to the voice recognition software 32. The host 18 may also complete call connections between the agent 20, 26 and customer 12, 14 using an ACD or VoIP telephony.

The recognized words of the agent 20, 26 may be maintained separately from the recognized words of the customer 12, 14 for reasons which will become apparent shortly. In addition to recognizing the word content of the conversation, the voice recognition software 32 may also detect and record a word rate. The scripting system 10 may also perform a fast Fourier transform (FFT) on each word spoken by the agent and customer using a FFT module 46. Such FFT may be performed to measure a pitch of the voices of each participant to the conversation. Word rate and pitch may together be used with the recognized words to measure excitement, anger as well as an overall presentation style of the agent 20, 26.

Under the illustrated embodiment, the host 18 presents telemarketing scripting 50 (FIG. 2) on a display 56 of the terminal 24, 30 of the agent 20, 26. The host 18 retrieves the scripting from a scripting file 42 stored in a database memory 38 of the host 18.

Figure 3:
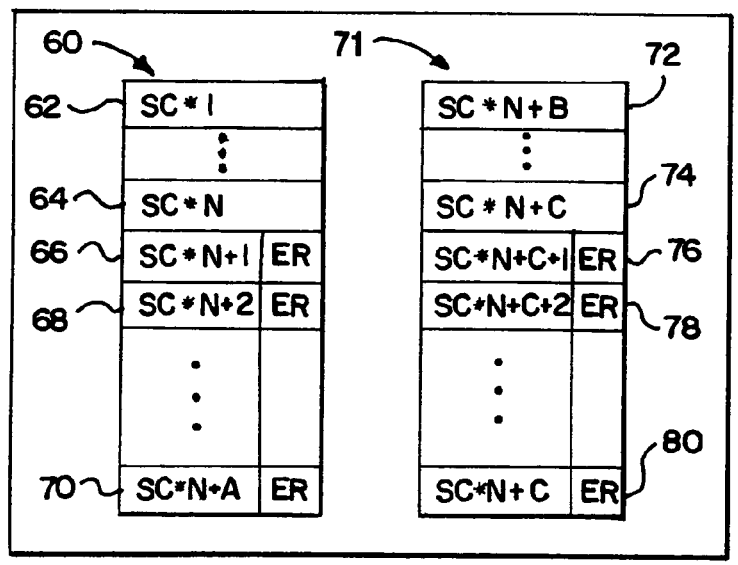
FIG. 3 depicts scripts within a memory of the system of FIG. 1.

Included within the memory 38 may be a number of scripts 60, 71 (FIG. 3). A first script 60 may be provided for a first type of customer 12. A second script 71 may be provided for another type of customer 14.

Further, even for a single script, a first set of paragraphs 62, 64 may follow a first story line. An auxiliary set of scripts (e.g., 66, 68, 70) may be provided for optional story lines. As shown in FIG. 3, the second script 71 and corresponding first set of paragraphs 72, 74, and an auxiliary set of scripts (e.g. 76, 78, 80) may similarly be provided. The auxiliary set of scripts 66, 68, 70 may be provided to allow an agent 20, 26 to respond to any of a number of situations involving optional customer reactions and concerns. Moreover, each auxiliary script may be associated with an expected customer response (ER) which may trigger use of the auxiliary script 66, 68, 70.

By concatenating portions of the story line 62, 64 and auxiliary scripts 66, 68, 70, an agent 20, 26 may engage in a threaded discussion with a customer 12, 14 which is much more likely to lead to closure of a sale for the telemarketer. As used herein, the term "threaded conversation" or "threaded discussion" means an information exchange between an agent 20, 26 and customer 12, 14 where a progressive (i.e., weighted) information content of the discussion at any instant of time is determined by a temporal relation of the comments submitted by the participants to the conversation and wherein the most recent comments carry the most weight.

As an example, the story line of script 62, 64 may revolve around sale of widgets. Absent any comments from the customer 12, 14, the paragraphs of the script 62, 64 may scroll across the screen 56 without interruption. However, the customer 12, 14 may ask any of a number of questions, thereby interrupting flow of the story line. For example, the customer 12, 14 may say "I already have one", or "I'm not interested", or "I might be interested", or "I am interested", or "I've heard that your widget is a terrible product" or "I hate that product". Alternatively, the customer 12, 14 may ask "Why do I need this" or "What are you selling", or "What good is it" or "Don't call here anymore", or "How do I order one", or "How long is delivery", or "Is there a guarantee", or "Can I return it". Each customer comment or question may require a different answer. To provide an appropriate response to each customer comment, a comparison may be made between each customer response and the scripts 62, 64, 66, 68, 70. Where a match is found, the matched script is presented to the agent to guide the agent through his conversation with the customer 12, 14.

Turning now to operation of the scripting system 10, a specific example will be offered. Under the example, a call may be set up between an agent 20, 26 and a customer 12, 14. The host 18 may connect a voice recognition unit 32 to a voice path from the agent 20, 26 and a voice recognition unit 32 to a voice path from the customer 12, 14.

The scripting system 10 may also retrieve and display an initial portion of a script 50 on a screen 56 of the agent 20, 26. The agent 20, 26 may begin reading the script 50. The voice recognition unit 32 may recognize the words spoken by the agent 20, 26. After the agent 20, 26 reads each portion, the scripting system 10 may recognize completion of the portion, but may pause before displaying the next portion. Such pause may be provided to allow the customer 12, 14 an opportunity to respond.

If the customer does not respond, then after a short pause, the scripting agent 10 causes the next portion of the script to be presented on the display 56 of the agent and the agent continues reading.

Under the illustrated embodiment, the scripting system 10 may receive and process a speech content from each conversation within a content processor 34. It should be understood that the scripting system 10 may simultaneously handle any number of threaded conversations.

The content processor 34 of the scripting system 10 may perform natural language processing in order to read through and parse text blocks of conversations to determine what questions or comments have been made and, once a question or comment has been identified, to pass the question to an information content processor 40 to get a response.

For example, the threaded conversation may be related to the sale of widgets. The customer may make the statement "How much is the widget"?

The content processor 34 functioning as a parsing processor may parse the content of the conversation for key words and/or key words in context. Any appropriate software may be used (e.g., Brightwares natural languages processing, NetPerceptions grouping/affinity alignment tools, etc.).

The words "How much" may be determined to be indicative of a question and an indication of the information desired. The word "widget" may be identified as a key word indicating a subject of the question.

Keywords may be weighted within a weighting processor 48 according to a time since they were last used to form a weighted information content, which reflect the threaded nature of the conversation. Keywords used more recently may be given a higher weight than older keywords. Keywords may also be weighted based upon a relative information content of each key word.

Weighting based upon time-of-use may be linear or based upon some other mathematical operator (e.g., asymptotic, hyperbolic, etc.). Upon receiving each response from the customer 12, 14, the content processor 34 determines a weighted information content for the conversation carried forward to that instant. The content processor 34 passes the weighted information content to the information content processor 40. The information content processor 40 proceeds to search a database 38 for similar material.

The search may be performed under any of a number of different formats. The information content processor may search for key words throughout the database or the weighted information content may be used to define a subject matter which may then be used to limit the database search.

In the example given above, the set of expected customer responses (ERs) may be searched first. Where the expected response substantially matches the recognized comment from the customer 12, 14, the associated script 66, 68, 70 is presented to the agent 20, 26.

If the recognized comment from the customer 12, 14 does not substantially match an expected response, then the information content processor 40 may begin processing the scripts for similarity of subject matter. The similarity of subject matter may be taken as a measure of the suitability of the material for presentation to the customer 12, 14.

Once similar materials have been located, the information content processor 48 may then endeavor to form an objective measure of the information content of the located material. The objective measure of information content may be based upon any appropriate gauge. For example, each of the key words identified within the threaded conversation and found within the located material may be weighted (i.e., using the corresponding weights of the weighted information content). The weights associated with each key word may then be summed. Key words not found within the located material would not be included within the sum (i.e., the missing key words would be given a value of zero), thereby providing a measure of the differences in information content.

Similarly, the weight values given to the key words of the weighted information content may be summed. An objective difference value may be determined by subtracting the sum of the weighted key words of the located material from the sum of the weighted, recognized key words of the conversation.

Alternatively, a Hamming distance may be determined between the words of the located material and the key words of the conversation. Identical words found within the located material may be given the highest value; synonyms a lesser value, related words a lesser value yet. Missing words may be given a value of zero. As above, the Hamming distance values assigned to each word of the located material may be multiplied by a corresponding weighting value and summed. As above, an objective difference value may be found by subtracting the summed, weighted Hamming distance values of the located information from the sum of the weights of the weighted information content.

Once an objective difference value has been determined, the difference value may be compared with a threshold within a comparator 36 to determine a measure of reliability. Where the objective difference value exceeds the threshold value, the located material may be presented to the agent 20, 26.

Figure 2:
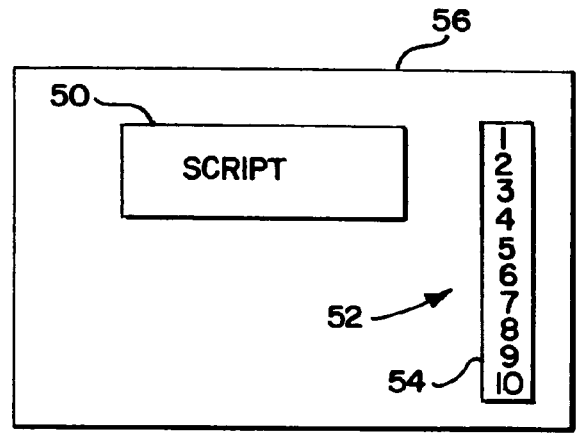
FIG. 2 is a screen that may be used by an agent of the system of FIG. 1.

To further improve agent performance, an subjective rating system may be used. Under the illustrated embodiment, a perceived receptiveness of the customer 12, 14 may be entered by the agent 20, 26 using a cursor 52 and a receptiveness scale 54 (FIG. 2). Using the receptiveness scale 54, the scripting system 10 may pace a storyline based upon a perceived receptiveness of the customer 12, 14.

Where a customer 12, 14 is perceived as being skeptical (e.g., the agent 20, 26 enters a low value on the receptiveness scale 54), the scripting system 10 may extend the storyline to include more detail directed to overcoming the customer's skepticism. Where the customer 12, 14 is perceived as being very receptive, the scripting system may omit significant detail and accelerate the story line by presenting script directed to closing the sale, thereby significantly improving the efficiency of the agent 20, 26.

Under another illustrated embodiment, the scripting system 10 may also provide scripting to disengage the agent 20, 26 where circumstances suggest a very low probability of a sale. For example, a disengagement processor 43 may be provided and operated in the background to monitor the recognized words for obscenities and/or negative comments. However, since some customers innocently using obscenities, the subjective evaluation of receptiveness entered by the agent 20, 26 may be used in connection with the detection of obscenities to identify a need to terminate the conversation.

Where a need is identified for termination of the conversation, the scripting system 10 would search for and present an appropriate a script to the agent 20, 26. For example, the script may simply say "We are sorry to have disturbed you, goodbye". Alternatively, the script may say "We are happy to hear that you already have a widget, even though you may have received it from our competitors. We hope we may call you again when a similarly exciting product becomes available. Goodbye".

The scripting system 10 may also include a deviation processor 47 to measure deviations in an agent's presentation and a presented script. By measuring deviations between the presented text and agent performance (i.e., sales performance), a script adapting processor 45 of the scripting system 10 may adapt the script to incorporate successful sales techniques.

For example, the agents 20, 26 would typically enter sales orders through their assigned terminals 24, 30. A performance processor 49 may compare sales totals among all agents 20, 26 and select the most successful agent. Alternatively, the performance processor 49 may compare sales totals with a sales threshold and select each agent with a sales total above a threshold value. In each case, the performance processor 49 may then compare the script presented to the selected agent with the recognized words (and pitch and word rate) used by the agent during his presentation to detect any differences. Where it is determined that the selected agent 20, 26 is consistently successful, the detected differences may be incorporated into script presented to all of the agents 20, 26. In order to incorporate subtleties such as pitch and word rate, parenthetical instructions may be inserted into the text to prompt the agent 20, 26 to follow successful techniques used by others.

Under an alternate embodiment, the agent 20, 26 may be replaced by a speech synthesizer 41. As script is presented to the synthesizer 41, the synthesizer 41 converts the text into speech into presentation to the customer 12, 14. As above, the script follows a predetermined story line until the threaded nature of the conversation departs from a preferred story line.

As above, the scripting system 10 follows the conversation by analyzing the comments from customer 12, 14 and from the synthesizer 41. The information content processor 48 forms an objective measure of the information content. The comparator 36 forms an objective difference value for any information located which conforms to the threaded path of the conversation. Where the objective difference value exceeds the threshold, the located script is transferred to the synthesizer 41 for oral presentation to the customer 12, 14.

A specific embodiment of a method and apparatus for creating scripts by translating agent/customer conversations according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of presenting script associated with a predetermined storyline to be followed by a telemarketer during a threaded conversation with a customer, such method comprising the steps of:

providing a plurality of auxiliary scripts at least some of which may be concatenated to form the predetermined storyline;

recognizing a word content of a response of the customer to a first portion of the presented script of the threaded conversation;

detecting key words and key words in context of the response;

evaluating the detected key words in context to determine information content of the key words in context;

comparing the information content of the evaluated words with an information content of a plurality of expected customer responses and selecting an expected customer response of the plurality of expected customer responses when the key words substantially match the selected expected customer response;

following a script of the plurality of scripts associated with the selected expected customer response of the customer as a second concatenated portion of the presented script of the predetermined storyline when the keywords substantially match the selected expected customer response; and when key words do not substantially match any of the plurality of expected customer responses, then selecting a script of the plurality of scripts as a second, concatenated portion of the presented script of the predetermine storyline based upon an objective difference value between keywords of the first portion of the threaded conversation and the selected script.

2. The method of presenting script as in claim 1 further comprising recognizing a word content of the telemarketer during presentation of the first portion.

3. The method of presenting script as in claim 1 wherein the step of recognizing a word content of the telemarketer during presentation of the first portion further comprises detecting deviations between the recognized word content of the telemarketer and the first portion of the presented script.

4. The method of presenting script as in claim 3 wherein the step of detecting deviations between the recognized word content of the telemarketer and the first portion of the presented script further comprises measuring an objective performance level of the telemarketer and associating the measured performance level with the deviation.

5. The method of presenting script as in claim 4 wherein the step of associating the measured performance level with the deviation further comprises changing the first portion of the script when the performance level exceeds a threshold level.

6. The method of presenting script as in claim 1 further comprising subjectively evaluating a response of the customer to the first portion of the presented script by the telemarketer.

7. The method of presenting script as in claim 6 further comprising using the subjective evaluation of the customer by the telemarketer to resolve ambiguity.

8. The method of presenting script as in claim 1 further comprising recognizing a negative response from the customer.

9. The method of presenting script as in claim 8 wherein the step of detecting a negative response further comprising recognizing obscenities in the response.

10. The method of presenting script as in claim 8 wherein the step of recognizing a negative response further comprises terminating the conversation.

11. An apparatus for presenting script associated with a predetermined storyline to be followed by a telemarketer during a threaded conversation with a customer, such apparatus comprising:

means for providing a plurality of auxiliary scripts at least some of which may be concatenated to form the predetermined storyline;

means for recognizing a word content of a response of the customer to a first portion of the presented script of the threaded conversation;

means for detecting key words and key words in context of the response;

means for evaluating the detected key words in context to determine information content of the key words in context;

means for comparing the information content of the evaluated words with an information content of a plurality of expected customer responses and selecting an expected customer response of the plurality of expected customer responses when the key words substantially match the selected expected customer response;

means for following a script of the plurality of scripts associated with the selected expected customer response of the customer as a second portion of the presented script of the predetermined storyline when the selected expected customer response substantially matches the key words; and means for selecting and following a script of the plurality of scripts as the second portion of the presented script of the predetermined storyline when key words do not substantially match any of the plurality of expected customer responses based upon an objective difference value between keywords of the first portion of the threaded conversation and the selected script.

12. The apparatus for presenting script as in claim 11 further comprising means for recognizing a word content of the telemarketer during presentation of the first portion.

13. The apparatus for presenting script as in claim 11 wherein the means for recognizing a word content of the telemarketer during presentation of the first portion further comprises means for detecting deviations between the recognized word content of the telemarketer and the first portion of the presented script.

14. The apparatus for presenting script as in claim 13 wherein the means for detecting deviations between the recognized word content of the telemarketer and the first portion of the presented script further comprises means for measuring an objective performance level of the telemarketer and associating the measured performance level with the deviation.

15. The apparatus for presenting script as in claim 14 wherein the means for associating the measured performance level with the deviation further comprises means for changing the first portion of the script when the performance level exceeds a threshold level.

16. The apparatus for presenting script as in claim 11 further comprising means for subjectively evaluating a response of the customer to the first portion of the presented script by the telemarketer.

17. The apparatus for presenting script as in claim 16 further comprising means for using the subjective evaluation of the customer by the telemarketer to resolve ambiguity.

18. The apparatus for presenting script as in claim 11 further comprising means for recognizing a negative response from the customer.

19. The apparatus for presenting script as in claim 18 wherein the means for detecting a negative response further comprising means for recognizing obscenities in the response.

20. The apparatus for presenting script as in claim 18 wherein the means for recognizing a negative response further comprises means for terminating the conversation.

21. An apparatus for presenting script associated with a predetermined storyline to be followed by a telemarketer during a threaded conversation with a customer, such apparatus comprising:

a plurality of auxiliary scripts at least some of which may be concatenated to form the predetermined storyline;

word recognition software adapted to recognize a word content of a response of the customer to a first portion of the presented script of the threaded conversation;

a parsing processor adapted to detect key words and key words in context of the response;

an information content processor adapted to evaluate the detected key words and key words in context to determine an information content;

an information comparator adapted to compare the information content of the evaluated key words with an information content of a plurality of expected customer responses and select an expected customer response of the plurality of expected customer responses when the key words substantially match the selected expected customer response;

a script display which allows an agent to follow a script of the plurality of auxiliary scripts associated with the selected expected customer response of the customer as a second portion of the presented script of the predetermined storyline when the selected expected Customer response substantially matches the key words; and said information comparator being further adapted to select a script of the plurality of scripts when the evaluated key words do not substantially match any of the plurality of expected customer responses based upon an objective difference value between keywords of the threaded conversation and the selected script.

22. The apparatus for presenting script as in claim 21 further comprising a deviation processor adapted to detect deviations between the recognized word content of the telemarketer and the first portion of the presented script.

23. The apparatus for presenting script as in claim 22 wherein the deviation processor further comprises a performance processor adapted to measure an objective performance level of the telemarketer and associating the measured performance level with the deviation.

24. The apparatus for presenting script as in claim 11 further comprising a cursor and receptiveness chart adapted to allow the telemarketer to subjectively evaluate a response of the customer to the first portion of the presented script by the telemarketer.

25. The apparatus for presenting script as in claim 21 further comprising a disengagement processor adapted to recognize obscenities in the response.

26. A method of selecting script for presentation to a customer during a threaded conversation, such method comprising the steps of:

providing a plurality of auxiliary scripts;

recognizing a word content of a response of the customer to a first portion of the threaded conversation;

detecting key words in context of the response;

evaluating the detected key words in context to determine an information content;

comparing the information content of the evaluated words with an information content of each of a plurality of expected customer response;

selecting an expected customer response of the plurality of expected customer responses when the selected expected customer response substantially matches the evaluated key words;

selecting a script associated with the selected expected customer response of the plurality of auxiliary scripts when the key words substantially match the selected expected customer response;

selecting a script of the plurality of auxiliary scripts when the key words do not substantially match any of the plurality of expected customer responses based upon an objective difference value between keywords of the first portion of the threaded conversation and the selected script;

presenting the selected script to the customer; and pacing the presentation of the presented script based upon a perceived receptiveness of the customer.

* * * * *